(12) United States Patent
Amemiya et al.

(10) Patent No.: US 12,047,665 B2
(45) Date of Patent: Jul. 23, 2024

(54) SHUTTER SYSTEM AND INSPECTION DEVICE

(71) Applicants: NIDEC COPAL CORPORATION, Tokyo (JP); FUJIFILM CORPORATION, Tokyo (JP)

(72) Inventors: Sena Amemiya, Tokyo (JP); Masaki Takamatsu, Kanagawa (JP); Jumpei Shiraishi, Kanagawa (JP); Kyohei Shibuya, Kanagawa (JP)

(73) Assignees: NIDEC COPAL CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 68 days.

(21) Appl. No.: 17/993,880

(22) Filed: Nov. 24, 2022

(65) Prior Publication Data

US 2023/0224568 A1 Jul. 13, 2023

(30) Foreign Application Priority Data

Jan. 12, 2022 (JP) ................. 2022-002953

(51) Int. Cl.
*H04N 23/56* (2023.01)
*G01N 21/78* (2006.01)
*G01N 21/77* (2006.01)

(52) U.S. Cl.
CPC ............. *H04N 23/56* (2023.01); *G01N 21/78* (2013.01); *G01N 2021/7759* (2013.01)

(58) Field of Classification Search
CPC ............... G01N 21/78; G01N 21/8483; G01N 21/8806; G01N 2021/7759; G01N 2201/064; H04N 23/56; H05K 5/00
See application file for complete search history.

(56) References Cited

U.S. PATENT DOCUMENTS

| 6,872,001 B1 | 3/2005 | Gilevich |
| 2005/0112587 A1 | 5/2005 | Sherrill et al. |

(Continued)

FOREIGN PATENT DOCUMENTS

| CN | 111551564 A | 8/2020 | |
| CN | 111551564 B | * 6/2022 | ............. G01N 21/01 |

(Continued)

OTHER PUBLICATIONS

Extended European Search Report in EP Application No. 22207418.9 dated Jun. 9, 2023, 5pp.

*Primary Examiner* — Maria E Vazquez Colon
(74) *Attorney, Agent, or Firm* — HAUPTMAN HAM, LLP

(57) ABSTRACT

An inspection device includes a small shutter in an opening of an inspection chamber, and a large shutter behind the small shutter. The small shutter has a closed state, an inward-open state, and an outward-open state. The small shutter in the inward-open or outward-open state is pushed by a workpiece and pivots inward in or outward from the inspection chamber. The large shutter has a light-shielding state, a driven state, and a stationary state. The large shutter in the light-shielding state overlaps the small shutter in the closed state and closes a clearance between the opening and the small shutter. The large shutter in the driven state is pushed by the small shutter in the inward-open state and pivots with the small shutter. The large shutter in the stationary state is separate from the small shutter in the outward-open state and at a same position as in the light-shielding state.

6 Claims, 13 Drawing Sheets

(56) References Cited

U.S. PATENT DOCUMENTS

| | | |
|---|---|---|
| 2007/0031283 A1 | 2/2007 | Davis et al. |
| 2013/0203627 A1 | 8/2013 | Moll et al. |
| 2014/0001348 A1* | 1/2014 | Runcie ............... G01N 21/6486 |
| | | 250/227.11 |
| 2015/0212229 A1 | 7/2015 | Walcher |

FOREIGN PATENT DOCUMENTS

| | | | | |
|---|---|---|---|---|
| EP | 2642085 A2 * | 9/2013 | ........... | F01D 21/003 |
| JP | S641972 A * | 1/1989 | | |
| JP | S641972 A | 1/1989 | | |
| JP | 4141278 B2 * | 8/2008 | | |
| JP | 2015075402 A * | 4/2015 | ............. | G01N 35/04 |
| JP | 5809951 B2 * | 11/2015 | | |
| WO | WO-9803946 A1 * | 1/1998 | ........... | G08B 17/107 |

\* cited by examiner

SHUTTER SYSTEM AND INSPECTION DEVICE

RELATED APPLICATIONS

The present application claims priority to Japanese Application Number 2022-002953, filed Jan. 12, 2022, the disclosure of which is hereby incorporated by reference herein in its entirety.

BACKGROUND

Technical Field

The present disclosure relates to a shutter system for an inspection device.

Description of the Background

Nowadays, various inspection devices and measurement devices are used in the fields of many industries including steel, automobiles, medicine, pharmaceuticals, and food. Such inspection devices and measurement devices may include inspection chambers or measurement chambers in which entry of light is restricted. For example, a resistivity measuring instrument described in Patent Literature 1 includes a measurement chamber, a shutter at an entrance and an exit of the measurement chamber, and a shutter opening-closing system to drive the shutter. The shutter opening-closing system drives the shutter to open and close the entrance and the exit of the measurement chamber. When the entrance and the exit are closed with the shutter, the inside of the measurement chamber is dark.

CITATION LIST

Patent Literature

Patent Literature 1: Japanese Unexamined Patent Application Publication No. 64-1972

BRIEF SUMMARY

The inspection device with an inspection chamber in which entry of light is restricted is expected to improve light-shielding of the inspection chamber while maintaining easy opening and closing.

A shutter system according to an embodiment is installable in an inspection device including an inspection chamber with restricted entry of light. The shutter system includes a first shutter located in an opening of the inspection chamber connecting an inside and an outside of the inspection chamber, and a second shutter located inside the inspection chamber and behind the first shutter. The first shutter has a closed state, an inward-open state, and an outward-open state. The first shutter in the closed state closes the opening. The first shutter in the inward-open state is pushed by an inspection object loaded into the inspection chamber through the opening and pivots inward in the inspection chamber. The first shutter in the outward-open state is pushed by the inspection object unloaded from the inspection chamber through the opening and pivots outward from the inspection chamber. The second shutter has a light-shielding state, a driven state, and a stationary state. The second shutter in the light-shielding state overlaps the first shutter in the closed state and closes a clearance between the opening and the first shutter. The second shutter in the driven state is pushed by the first shutter in the inward-open state and pivots together with the first shutter. The second shutter in the stationary state is separate from the first shutter in the outward-open state and is at a same position as in the light-shielding state.

The technique according to the above aspect of the present invention allows an inspection device with an easy opening-closing operation and high light-shielding performance.

DETAILED DESCRIPTION

Figure 1:
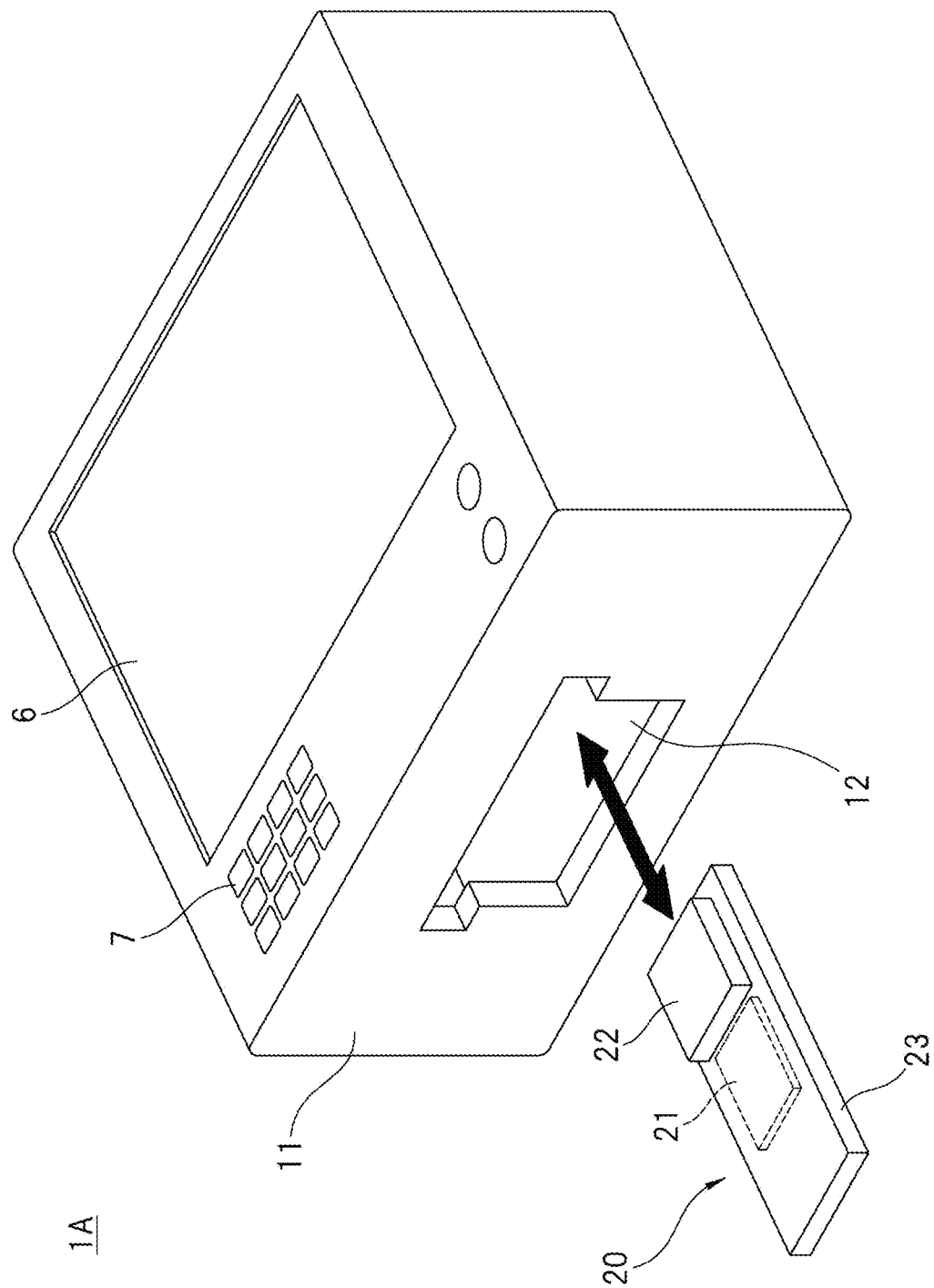
FIG. 1 is an external perspective view of an inspection device.

One or more embodiments of the present invention will now be described in detail with reference to the drawings. In the drawings used to describe the embodiments, the same reference numerals denote the same or substantially the same components or elements. Such components or elements will not basically be described repeatedly.

Inspection Device

Figure 2:
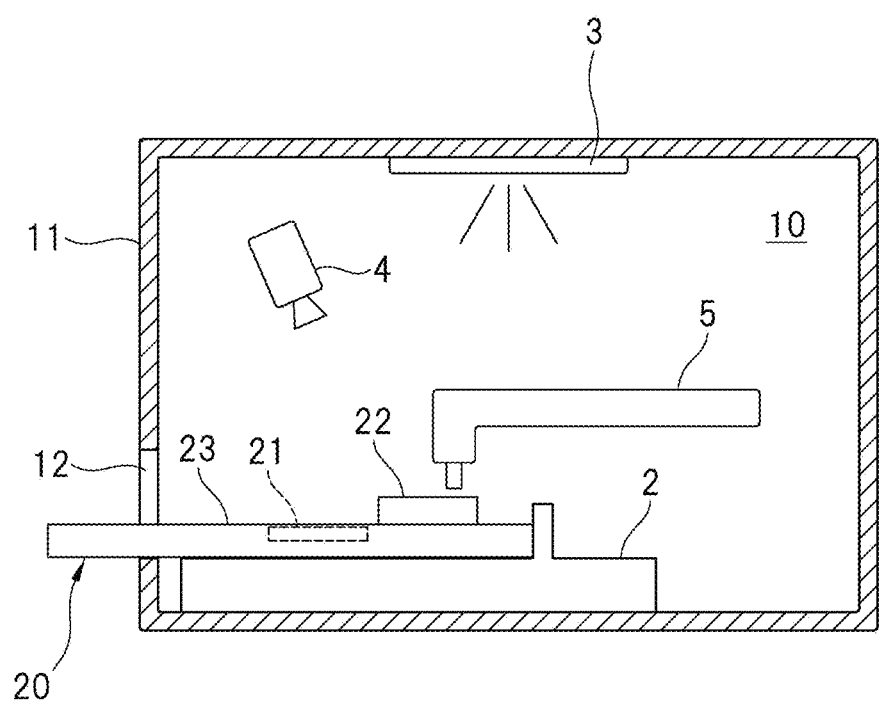
FIG. 2 is a schematic diagram of the inspection device.

FIG. 1 is an external perspective view of an inspection device 1A. FIG. 2 is a schematic diagram of the inspection device 1A. The inspection device 1A shown in FIGS. 1 and 2 includes an inspection chamber 10 separate from the surroundings, in which entry of light is restricted. The inspection chamber 10 includes a side wall 11 having an opening 12 connecting the inside and the outside of the inspection chamber 10, through which an object 20 to be inspected can be placed in and removed out of the inspection chamber 10. More specifically, the inspection object 20 can be loaded into the inspection chamber 10 through the opening 12. The inspection object 20 can be also unloaded from the inspection chamber 10 through the opening 12. The inspection object 20 to be loaded into and unloaded from the inspection chamber 10 may be referred to as a workpiece 20.

The workpiece 20 in the present embodiment includes a specimen container 21 to contain a specimen, a reagent container 22 to contain a reagent, and test paper (not shown) with the color changeable in response to the reaction between the specimen and the reagent. The specimen container 21 is embedded in a flat base 23. The reagent container 22 is located on the upper surface of the base 23 and protrudes from the upper surface of the base 23. In other words, the reagent container 22 is a protrusion or a raised portion on the workpiece 20. The specimen to be contained in the specimen container 21 is, for example, human saliva or blood.

The inspection chamber 10 includes an internal guide 2 to guide a workpiece 20 to be placed in and removed out of the inspection chamber 10. The inspection chamber 10 also includes a light source (e.g., a light-emitting diode or an LED) 3, a camera 4, and an actuator 5. The inspection device 1A includes a display (e.g., a liquid crystal monitor) 6 and an operation button 7 on its upper surface.

The actuator 5 located in the inspection chamber 10 presses the reagent container 22 in response to the workpiece 20 being loaded to a predetermined position. The reagent is then pushed out of the reagent container 22 to mix with the specimen placed in the specimen container 21. The light source 3 illuminates the workpiece 20 located in the inspection chamber 10. The camera 4 captures an image of the workpiece 20 illuminated with the illumination light. The inspection device 1A then detects any change in the color of the test paper or determines the degree of any such change based on the image of the workpiece 20 (workpiece image) captured with the camera 4.

Shutter System

Figure 3:
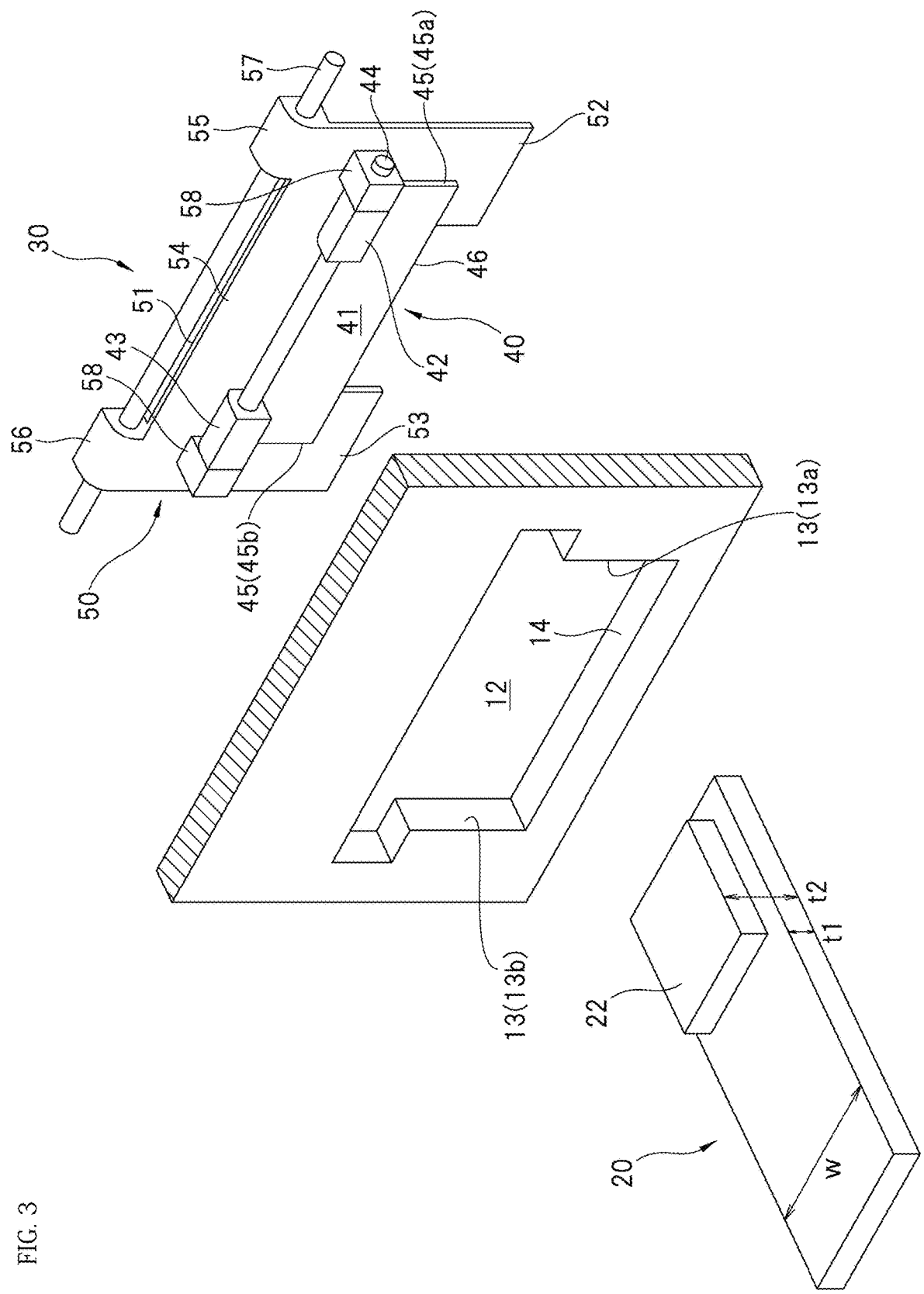
FIG. 3 is a perspective view of a shutter system.
Figure 4:
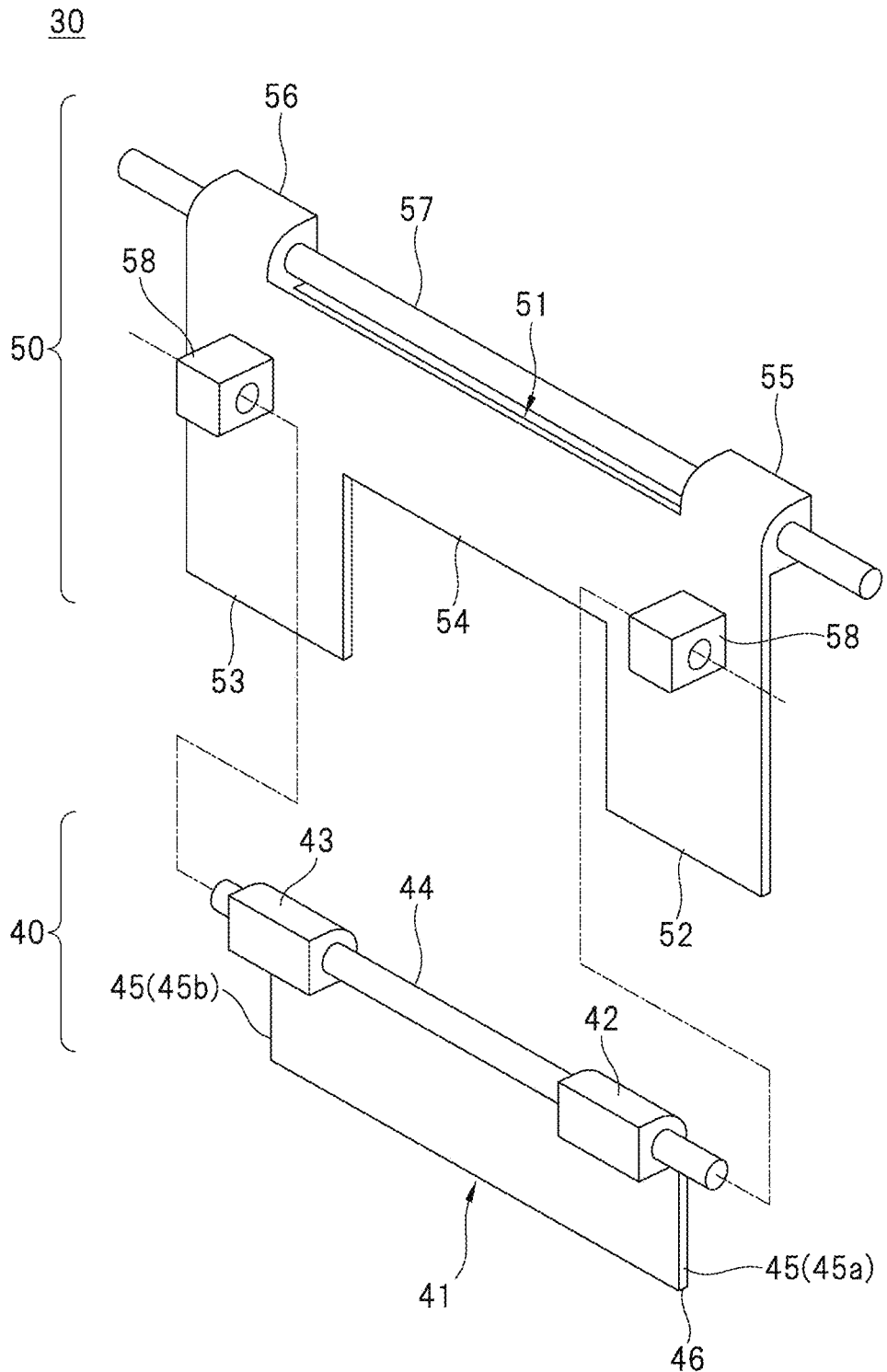
FIG. 4 is an exploded view of the shutter system.
Figure 5:
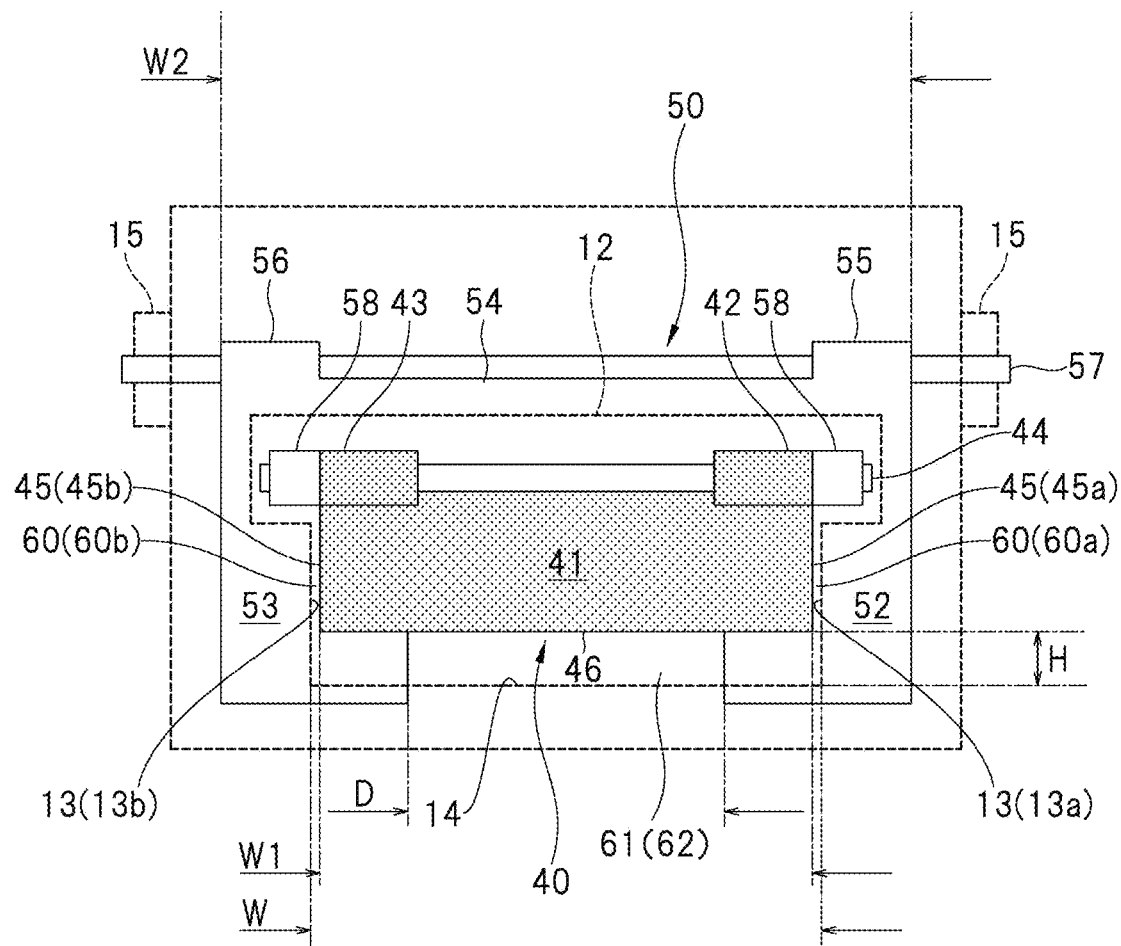
FIG. 5 is a front view of the shutter system.

FIG. 3 is a perspective view of a shutter system 30. FIG. 4 is an exploded view of the shutter system 30. FIG. 5 is a front view of the shutter system 30.

As described above, the inspection device 1A detects a change in the color of the test paper or any other factors based on the workpiece image captured with the camera 4 installed inside the inspection chamber 10. The image of the workpiece can be affected by any light (external light) entering the inspection chamber 10 during imaging of the workpiece. The workpiece 20 is to be illuminated with light emitted from the light source 3 alone during imaging of the workpiece.

Thus, the inspection device 1A is expected to restrict any light from entering the inspection chamber 10. The inspection device 1A is expected to allow the workpiece 20 to be easily placed in and removed out of the inspection chamber 10. More specifically, the inspection chamber 10 is expected to have both an easy opening-closing operation and high light-shielding performance.

In response to the above request, the inspection device 1A includes a shutter system 30 operable to open and close the opening 12. The shutter system 30 includes a first shutter 40 and a second shutter 50. The first shutter 40 is smaller than the opening 12 and is located in the opening 12. The second shutter 50 is larger than the first shutter 40 and is located in the inspection chamber 10. The first shutter 40 may be hereafter referred to as a small shutter 40, and the second shutter 50 as a large shutter 50.

First Shutter (Small Shutter)

The small shutter 40 includes a substantially rectangular shutter plate 41 with a width (W1) being substantially the same as the width (W) of the opening 12. The shutter plate 41 is a flat plate formed from a metal or a synthetic resin and has a size (area) enough to close a large portion of the opening 12. The shutter plate 41 is light-shielding.

The small shutter 40 further includes a pair of fixtures 42 and 43. More specifically, the two fixtures 42 and 43 are integral with an upper portion of the shutter plate 41. The fixture 42 is located on one side of the shutter plate 41 in the width direction, and the fixture 43 is located on the other side of the shutter plate 41 in the width direction.

The width direction of the shutter plate 41 is hereafter referred to as the lateral direction. The side on which the fixture 42 is located is referred to as the right, and the side on which the fixture 43 is located is referred to as the left. The fixture 42 may thus be referred to as the right fixture 42, and the fixture 43 may be referred to as the left fixture 43.

The small shutter 40 includes a support shaft 44 with a length greater than its width (W1). The support shaft 44 is fixed to the shutter plate 41 in a manner nonrotatable relative to each other. More specifically, the support shaft 44 has one end press-fitted into the right fixture 42, and the other end press-fitted into the left fixture 43. The support shaft 44 has one end placed through the right fixture 42 and protruding rightward from the shutter plate 41, and the other end placed through the left fixture 43 and protruding leftward from the shutter plate 41.

The right end of the support shaft 44 protruding rightward from the shutter plate 41 is rotatably supported by a bearing 58 on one side of the large shutter 50, and the left end of the support shaft 44 protruding leftward from the shutter plate 41 is rotatably supported by another bearing 58 on the other side of the large shutter 50. More specifically, the small shutter 40 is rotatably attached to the large shutter 50. The support shaft 44 serves as the rotation axis of the small shutter 40.

The width (W1) of the shutter plate 41 is substantially the same as the width (W) of the opening 12 but is slightly smaller (narrower) than the width (W) of the opening 12. An inner side surface 13 of the opening 12 and an outer side surface 45 of the small shutter 40 (shutter plate 41) can thus face each other but are not in contact with each other.

The height of the shutter plate 41 is lower than the height of the opening 12. A bottom surface 14 of the opening 12 and a lower end surface 46 of the small shutter 40 (shutter plate 41) can thus face each other but are not in contact with each other.

Thus, the small shutter 40 is movable (rotatable) inside the opening 12 without being obstructed, while avoiding fully closing the opening 12. More specifically, when the opening 12 is closed with the small shutter 40, a clearance 60 is left between the inner side surface 13 of the opening 12 and the outer side surface 45 of the small shutter 40. Also, a clearance 61 is left between the bottom surface 14 of the opening 12 and the lower end surface 46 of the small shutter 40.

More specifically, a clearance 60a is left between a right inner side surface 13a of the opening 12 and a right outer side surface 45a of the small shutter 40. Also, a clearance 60b is left between a left inner side surface 13b of the opening 12 and a left outer side surface 45b of the small shutter 40.

The clearance 61 between the bottom surface 14 of the opening 12 and the lower end surface 46 of the small shutter 40 has a height (H) substantially the same as the thickness (t1) of the base 23 of the workpiece 20 shown in FIG. 3. However, the height (H) of the clearance 61 is lower than a thickness (t2) of the workpiece 20 including the reagent container 22. In other words, the height (H) of the clearance 61 is higher than the height of the base 23 and lower than the total height of the workpiece 20. The opening 12 and the shutter plate 41 have the heights to leave the clearance 61 with the above height.

Second Shutter (Large Shutter)

The large shutter 50 is located inside the inspection chamber 10 and behind the small shutter 40. The large shutter 50 includes a shutter plate 51 with a width (W2) greater than the width (W) of the opening 12. The shutter plate 51 is a flat plate formed from a metal or a synthetic resin and is light-shielding.

More specifically, the shutter plate 51 includes a right light shield 52, a left light shield 53, and a middle portion 54. The middle portion 54 connects an upper portion of the right light shield 52 and an upper portion of the left light shield 53. The shutter plate 41 is thus substantially rectangular as a whole, whereas the shutter plate 51 is substantially U-shaped as a whole. In other words, the shutter plate 51 is a gantry plate.

The shutter plate 51, which is wider than the opening 12, is wider than the shutter plate 41 (W1<W<W2). Thus, when the shutter plate 41 and the shutter plate 51 overlap, the right and left ends of the shutter plate 51 extends beyond the right and left ends of the shutter plate 41. When the large shutter 50 overlaps the back surface of the small shutter 40 closing the opening 12, the clearance 60 is closed with the large shutter 50.

More specifically, the right light shield 52 extends rightward beyond the shutter plate 41 to close the clearance 60a between the right inner side surface 13a of the opening 12 and the right outer side surface 45a of the small shutter 40. Similarly, the left light shield 53 extends leftward beyond the shutter plate 41 to close the clearance 60b between the left inner side surface 13b of the opening 12 and the left outer side surface 45b of the small shutter 40.

Also, when the large shutter 50 overlaps the back surface of the small shutter 40 closing the opening 12, the clearance 61 is partly closed with the large shutter 50. More specifically, a right portion of the clearance 61 is closed with a lower part of the right light shield 52. A left portion of the clearance 61 is also closed with a lower part of the left light shield 53.

This structure creates a space defined by the shutter plate 41 and the shutter plate 51 under the small shutter 40. As described above, this space is a part of the opening 12 as well as a part of the clearance 61. The height of this space can also be the same as the height (H) of the clearance 61. Further, the width of the space is the same as a facing distance (D) between the inner side surface of the right light shield 52 and the inner side surface of the left light shield 53. The facing distance (D) between the inner side surface of the right light shield 52 and the inner side surface of the left light shield 53 in the present embodiment is slightly greater (wider) than the width (w) of the base 23 of the workpiece 20 shown in FIG. 3.

In other words, when the large shutter 50 overlaps the back surface of the small shutter 40 closing the opening 12, a space with a height and a width that allows the base 23 of the workpiece 20 to pass through the space is defined under the small shutter 40. This space may be hereafter referred to as a loading port 62.

The large shutter 50 includes a pair of fixtures 55 and 56. More specifically, the two fixtures 55 and 56 are integral with an upper portion of the shutter plate 51. The fixture 55 is located on one side of the shutter plate 51 in the width direction. The fixture 56 is located on the other side of the shutter plate 51 in the width direction. The fixture 55 may be referred to as the right fixture 55, and the fixture 56 may be referred to as the left fixture 56.

The large shutter 50 also includes a support shaft 57 with a length greater than its width (W2). The support shaft 57 is fixed to the shutter plate 51 in a manner nonrotatable relative to each other. More specifically, the support shaft 57 has one end press-fitted into the right fixture 55, and the other end press-fitted into the left fixture 56. The support shaft 57 has one end placed through the right fixture 55 and protruding rightward from the shutter plate 51, and the other end placed through the left fixture 56 and protruding leftward from the shutter plate 51.

The right end of the support shaft 57 protruding rightward from the shutter plate 51 is rotatably supported by a bearing 15 on the side wall 11 of the inspection chamber 10. The left end of the support shaft 57 protruding leftward from the shutter plate 51 is rotatably supported by another bearing 15 on the side wall 11 of the inspection chamber 10. More specifically, the large shutter 50 is rotatably attached to the side wall 11 of the inspection chamber 10. The support shaft 57 serves as the rotation axis of the large shutter 50.

Shutter Operation (Loading of Workpiece)

Figure 6:
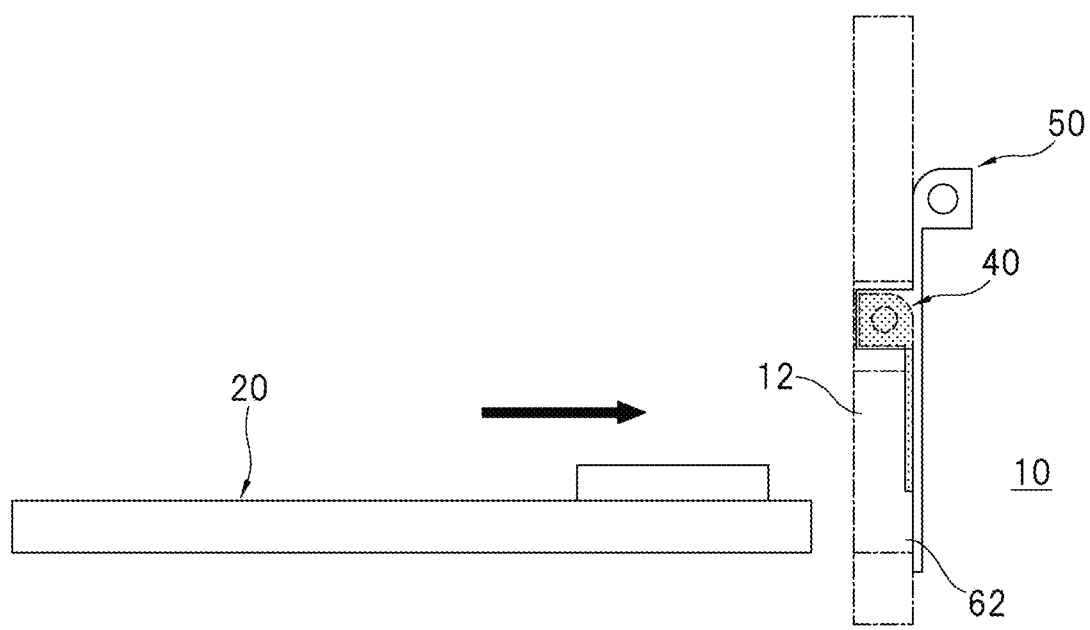
FIG. 6 is a side view of a small shutter and a large shutter before a workpiece is loaded into the inspection chamber.
Figure 7A:
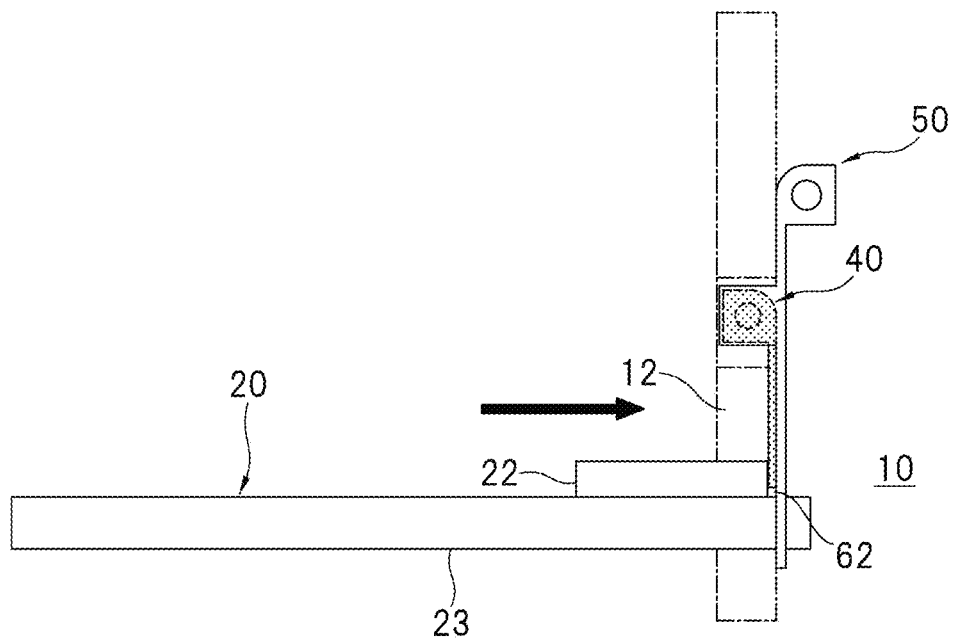
FIG. 7A is a side view of the small shutter and the large shutter while the workpiece is being loaded into the inspection chamber.
Figure 7B:
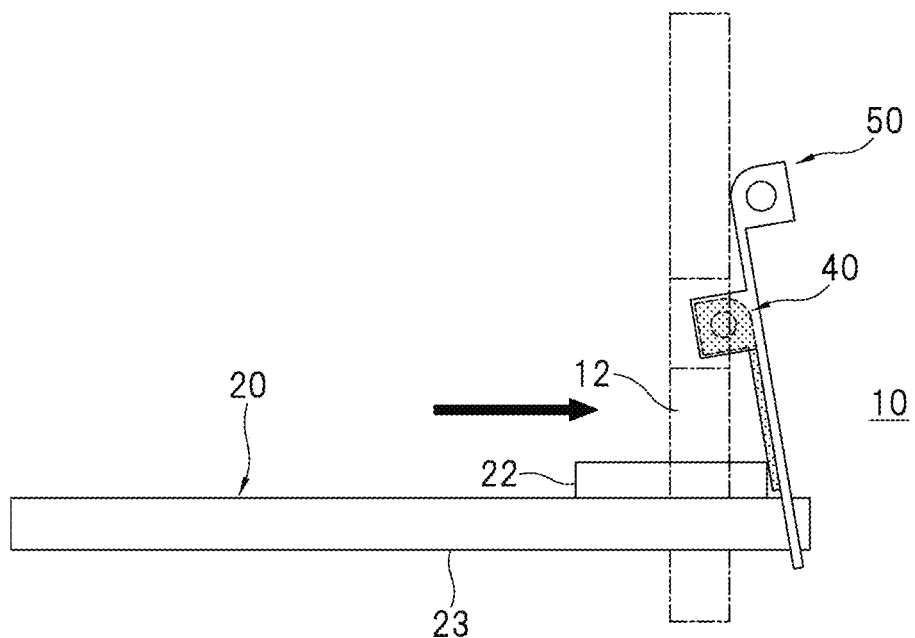
FIG. 7B is another side view of the small shutter and the large shutter while the workpiece is being loaded into the inspection chamber.
Figure 7C:
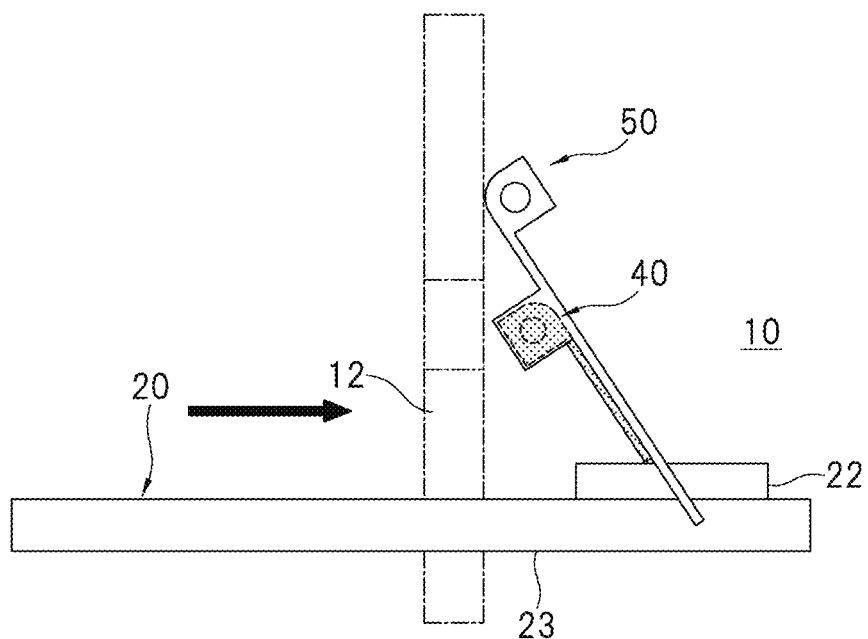
FIG. 7C is another side view of the small shutter and the large shutter while the workpiece is being loaded into the inspection chamber.
Figure 8:
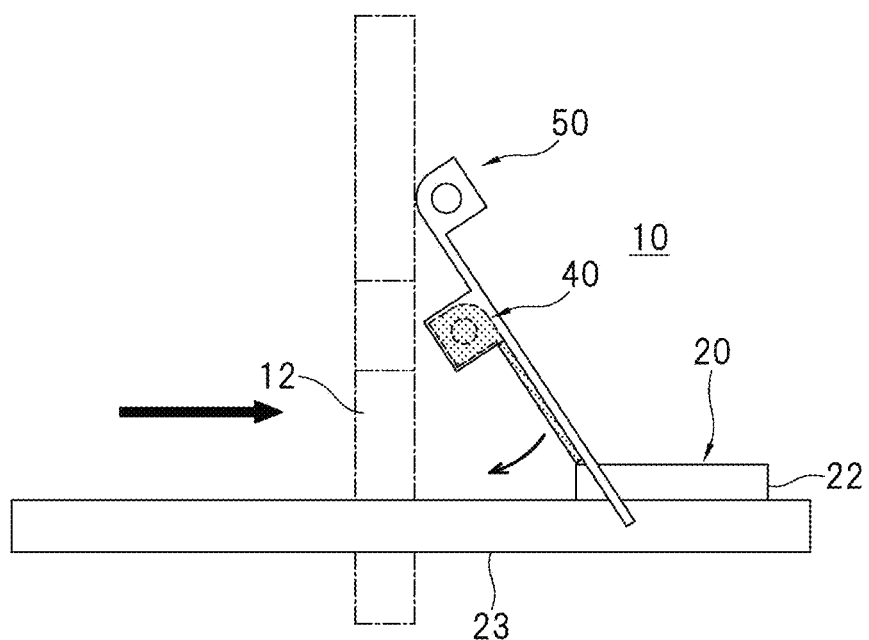
FIG. 8 is a side view of the small shutter and the large shutter when the workpiece is loaded to a predetermined position inside the inspection chamber.

FIG. 6 is a side view of the small shutter 40 and the large shutter 50 before the workpiece 20 is loaded into the inspection chamber 10. FIGS. 7A, 7B, and 7C are side views of the small shutter 40 and the large shutter 50 while the workpiece 20 is being loaded into the inspection chamber 10. FIG. 8 is a side view of the small shutter 40 and the large shutter 50 when the workpiece 20 is loaded to the predetermined position inside the inspection chamber 10.

As shown in FIG. 6, the small shutter 40 closes the opening 12 (closed state) before the workpiece 20 is loaded into the inspection chamber 10. In this state, the large shutter 50 overlaps the back surface of the closed small shutter 40, thus closing the clearance 60 (FIG. 5) between the opening 12 and the small shutter 40 (light-shielding state).

More specifically, the right light shield 52 of the shutter plate 51 closes the clearance 60a, and the left light shield 53 of the shutter plate 51 closes the clearance 60b. The loading port 62 is defined under the small shutter 40.

As shown in FIG. 7A, when the workpiece 20 (base 23) is loaded into the inspection chamber 10 through the opening 12 (loading port 62), the workpiece 20 (reagent container 22) comes in contact with a front lower surface of the small shutter 40 (shutter plate 41).

As shown in FIGS. 7B and 7C, when the workpiece 20 is loaded further into the inspection chamber 10, the small shutter 40 is pushed by the workpiece 20 (reagent container 22), thus pivoting inward in the inspection chamber 10 (inward-open state). At the same time, the large shutter 50 is pushed by the small shutter 40, thus pivoting together with the small shutter 40 (driven state).

In other words, the workpiece 20 rotates the small shutter 40 and the large shutter 50 to open the opening 12. The workpiece 20 comes in contact with the small shutter 40 and moves inward in the inspection chamber 10 while supporting the small shutter 40 and the large shutter 50.

As shown in FIG. 8, when the workpiece 20 is loaded to the predetermined position inside the inspection chamber 10, the workpiece 20 (reagent container 22) and the small shutter 40 in the inward-open state are out of contact from each other. The small shutter 40 under its own weight then changes from the inward-open state to the closed state. At the same time, the large shutter 50 under its own weight changes from the driven state to the light-shielding state.

The opening 12 is thus largely closed with the small shutter 40. The clearance 60 (FIG. 5) between the opening 12 and the small shutter 40 is also closed with the large shutter 50.

When the workpiece 20 is loaded to the above predetermined position, the base 23 has a part (front portion) located inside the inspection chamber 10 and another part (rear portion) located outside the inspection chamber 10. In other words, the rear portion of the base 23 is exposed outside the inspection chamber 10. More specifically, the base 23 extends inward and outward from the inspection chamber 10 through the loading port 62. The loading port 62 (base 23) is thus closed with the workpiece 20.

More specifically, when the small shutter 40 changes from the inward-open state to the closed state, and the large shutter 50 changes from the driven state to the light-shielding state, the opening 12 is largely closed with the small shutter 40. The clearance 60 between the inner side surface 13 of the opening 12 and the outer side surface 45 of the small shutter 40 is closed with the large shutter 50. Further, the other part of the opening 12 (loading port 62) that remains not closed with the small shutter 40 and the large shutter 50 is closed with the workpiece 20. The inspection chamber 10 is almost fully shielded from light. This structure prevents light from entering the inspection chamber 10 or traveling out of the inspection chamber 10.

The workpiece 20, which is loaded further into the inspection chamber 10, reaches the inspection position at which a predetermined inspection is performed (at which an image of the workpiece is captured). After the workpiece 20 reaches the inspection position (imaging position), the small shutter 40 remains in a closed state and the large shutter 50 remains in a light-shielding state. The loading port 62 is thus closed with the base 23 of the workpiece 20. In other words, the inspection chamber 10 remains light-shielded.

Shutter Operation (Unloading of Workpiece)

Figure 9:
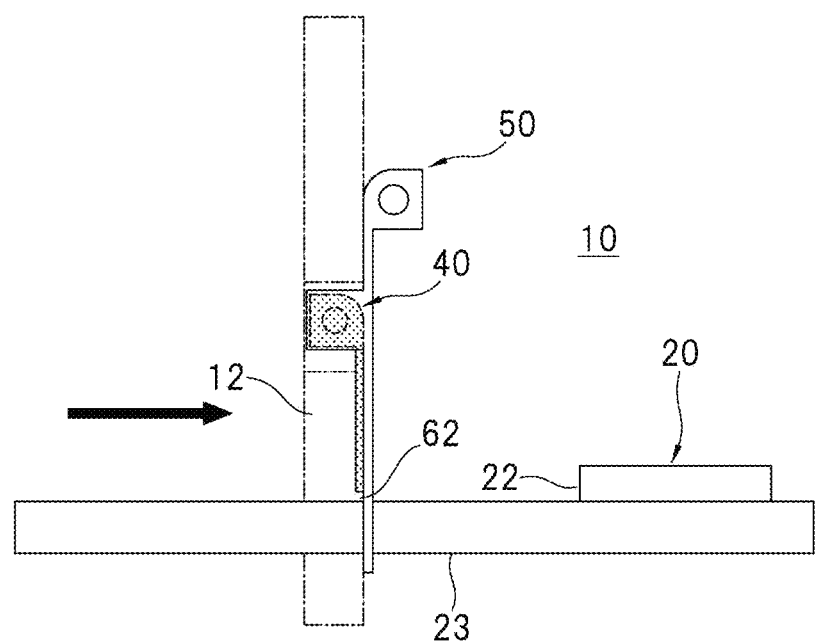
FIG. 9 is a side view of the small shutter and the large shutter when the workpiece is at an inspection position (imaging position) inside the inspection chamber.
Figure 10A:
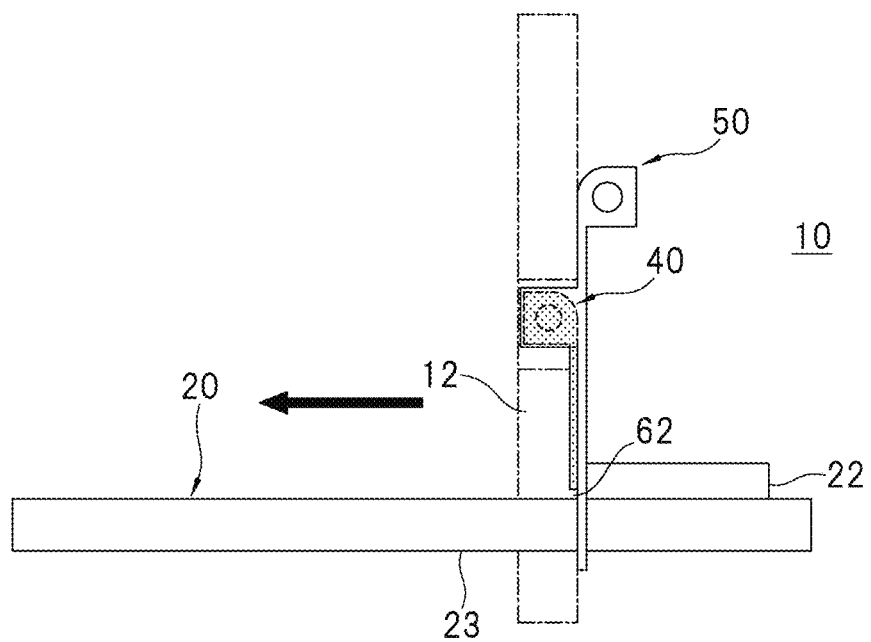
FIG. 10A is a side view of the small shutter and the large shutter while the workpiece is being unloaded from the inspection chamber.
Figure 10B:
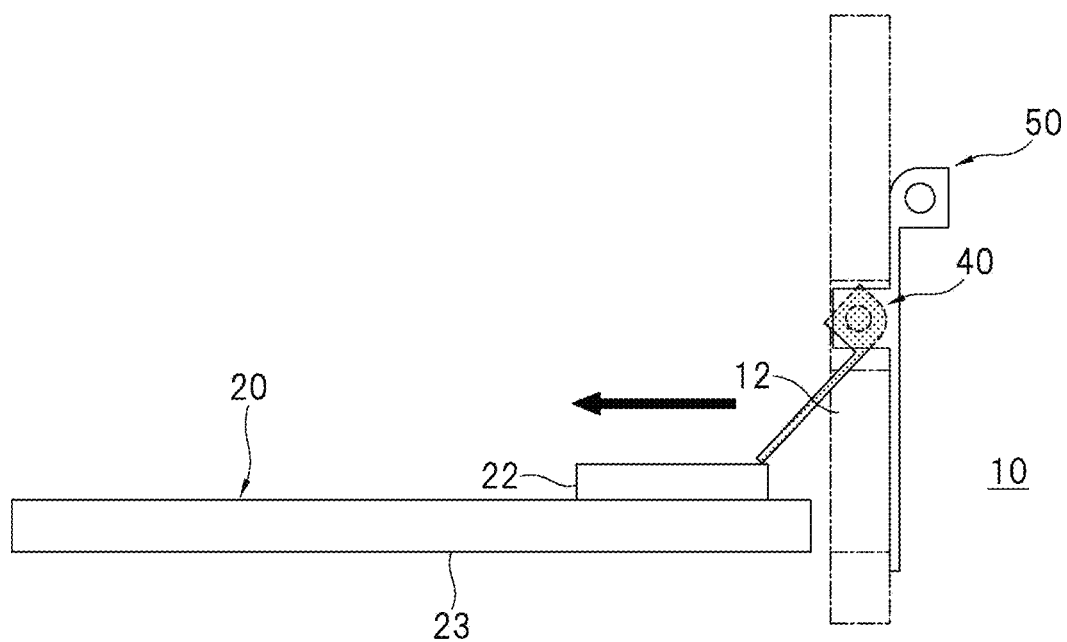
FIG. 10B is another side view of the small shutter and the large shutter while the workpiece is being unloaded from the inspection chamber.

FIG. 9 is a side view of the small shutter 40 and the large shutter 50 when the workpiece 20 is at the inspection position (imaging position) inside the inspection chamber 10. FIGS. 10A and 10B are side views of the small shutter 40 and the large shutter 50 while the workpiece 20 is being unloaded from the inspection chamber 10.

When the workpiece 20 shown in FIG. 9 is unloaded from the inspection chamber 10 through the opening 12 (loading port 62), the workpiece 20 (reagent container 22) comes in contact with a back lower surface of the small shutter 40 (shutter plate 41) as shown in FIG. 10A.

As shown in FIG. 10B, when the workpiece 20 is further unloaded from the inspection chamber 10, the small shutter 40 is pushed by the workpiece 20 (reagent container 22), thus pivoting outward from the inspection chamber 10 (outward-open state). The large shutter 50 is separate from the small shutter 40 and is at the same position as in its light-shielding state (stationary state). In other words, the small shutter 40 pivots outward from the inspection chamber 10, leaving the large shutter 50 behind.

The workpiece 20 causes the small shutter 40 to pivot and open the opening 12. The workpiece 20 comes in contact with the small shutter 40 and moves outward from the inspection chamber 10 while supporting the small shutter 40.

When the workpiece 20 is unloaded to a predetermined position outside the inspection chamber 10, the workpiece 20 (reagent container 22) and the small shutter 40 are out of contact from each other. The small shutter 40 under its own weight then changes from the outward-open state to the closed state. The large shutter 50 then changes from the stationary state to the light-shielding state. The small shutter 40 and the large shutter 50 return to the state shown in FIG. 6.

As described above, the small shutter 40 and the large shutter 50 are open inward together with the workpiece 20 that is being loaded into the inspection chamber 10 through the opening 12. The small shutter 40 and the large shutter 50 under their own weights are closed automatically when the workpiece 20 is loaded to the predetermined position before the inspection position. The opening 12 is then almost fully closed with the small shutter 40, the large shutter 50, and the workpiece 20. In other words, the inspection chamber 10 is almost fully shielded from light. The small shutter 40 is open outward by the workpiece 20 that is being unloaded from the inspection chamber 10 through the opening 12.

As described above, the inspection device 1A according to the present embodiment includes the inspection chamber 10 with an easy opening-closing operation and high light-shielding performance.

The present invention is not limited to the above embodiment, but may be modified variously without departing from the spirit and scope of the invention. For example, the appearance and the structure of the inspection device 1A shown in FIGS. 1 and 2 are examples, and can be changed as appropriate. The shutter system 30 shown in FIG. 3 and other figures may be installed in inspection devices or measuring devices other than inspection devices used for inspecting saliva or blood. Further, the first shutter 40 and the second shutter 50 may have various additional features as appropriate for the inspection device. For example, in addition to being light-shielding, the first shutter and the second shutter may also be radiation-shielding or sound-insulating.

What is claimed is:

1. A shutter system installable in an inspection device including an inspection chamber with restricted entry of light, the shutter system comprising:
    a first shutter located in an opening of the inspection chamber, the opening connecting an inside and an outside of the inspection chamber; and
    a second shutter located inside the inspection chamber and behind the first shutter,
    wherein the first shutter has a closed state, an inward-open state, and an outward-open state,
    the first shutter in the closed state closes the opening,
    the first shutter in the inward-open state is pushed by an inspection object loaded into the inspection chamber through the opening and pivots inward in the inspection chamber,
    the first shutter in the outward-open state is pushed by the inspection object unloaded from the inspection chamber through the opening and pivots outward from the inspection chamber,
    the second shutter has a light-shielding state, a driven state, and a stationary state,
    the second shutter in the light-shielding state overlaps the first shutter in the closed state and closes a clearance between the opening and the first shutter,
    the second shutter in the driven state is pushed by the first shutter in the inward-open state and pivots together with the first shutter, and
    the second shutter in the stationary state is separate from the first shutter in the outward-open state and is at a same position as in the light-shielding state.

2. The shutter system according to claim 1, wherein in response to the inspection object pushing the first shutter in the inward-open state being loaded to a predetermined position inside the inspection chamber, the inspection object and the first shutter are out of contact from each other, and in response to the inspection object and the first shutter being out of contact from each other, the first shutter under a weight of the first shutter changes from the inward-open state to the closed state, and the second shutter under a weight of the second shutter changes from the driven state to the light-shielding state.

3. The shutter system according to claim 1, wherein the second shutter in the light-shielding state closes the clearance between an inner side surface of the opening and an outer side surface of the first shutter facing each other.

4. The shutter system according to claim 1, wherein the second shutter is rotatably supported by a bearing attached to the inspection device, and the first shutter is rotatably supported by a bearing attached to the second shutter.

5. An inspection device, comprising:

an inspection chamber with restricted entry of light;

an opening connecting an inside and an outside of the inspection chamber; and a shutter system operable to open and close the opening, wherein the shutter system includes a first shutter located in the opening and a second shutter located inside the inspection chamber and behind the first shutter, the first shutter has a closed state, an inward-open state, and an outward-open state, the first shutter in the closed state closes the opening, the first shutter in the inward-open state is pushed by an inspection object loaded into the inspection chamber through the opening and pivots inward in the inspection chamber, the first shutter in the outward-open state is pushed by the inspection object unloaded from the inspection chamber through the opening and pivots outward in the inspection chamber, the second shutter has a light-shielding state, a driven state, and a stationary state, the second shutter in the light-shielding state overlaps the first shutter in the closed state and closes a clearance between the opening and the first shutter, the second shutter in the driven state is pushed by the first shutter in the inward-open state and pivots together with the first shutter, and the second shutter in the stationary state is separate from the first shutter in the outward-open state and is at a same position as in the light-shielding state.

6. The inspection device according to claim 5, further comprising:

a light source located in the inspection chamber to illuminate the inspection object; and a camera located in the inspection chamber to capture an image of the inspection object.

* * * * *